United States Patent [19]
Bonnemay et al.

[11] 3,870,565
[45] Mar. 11, 1975

[54] CATHODE FOR THE REDUCTION OF OXYGEN AND A RECHARGEABLE CELL COMPRISING SAID CATHODE

[76] Inventors: Maurice Bonnemay, 240, bd. Jean-Jaures, Boulogne-Billancourt, Haut-de-Seine; Guy René Bronoël, 60, avenue des Etats-Unis, Versailles, Yvelines; Jean-Baptiste Donnet, 29, rue Zwiellem, Didenheim, Haut-Rhin; Jacques Lahaye, 31, rue George Sand, Mulhouse, Haut-Rhin; Joël Alain Sarradin, 46, avenue de Cressac "commanderie des Templiers", Elancourt, Yvelines, all of France

[22] Filed: June 14, 1974

[21] Appl. No.: 480,139

[30] Foreign Application Priority Data
June 19, 1973 France .............................. 73.22182

[52] U.S. Cl. ................ 136/86 A, 136/121, 136/122
[51] Int. Cl. ..................... H01m 27/04, H01m 35/00
[58] Field of Search .......... 136/86 A, 6 R, 121, 122; 252/445

[56] References Cited
UNITED STATES PATENTS

| | | | |
|---|---|---|---|
| 2,000,815 | 5/1935 | Berl .................................. | 136/121 |
| 2,120,618 | 6/1938 | Marilus et al. ...................... | 136/121 |
| 3,158,510 | 11/1964 | Talvenheimo ...................... | 136/122 |

*Primary Examiner*—John H. Mack
*Assistant Examiner*—H. A. Feeley
*Attorney, Agent, or Firm*—Young and Thompson

[57] ABSTRACT

An electrochemical catalyst is placed on a support so as to constitute an air cathode for the reduction of oxygen which is primarily intended for use in a reversible or rechargeable fuel cell. The catalyst consists of finely-divided and non-porous carbon of the carbon black type constituted by a chain of substantially spherical particles and having a specific surface within the range of 50 to 600 m²/g, the carbon black having been subjected to a thermochemical treatment in a chlorine atmosphere at a temperature within the range of 1500° to 3000°C.

6 Claims, 7 Drawing Figures

CATHODE FOR THE REDUCTION OF OXYGEN AND A RECHARGEABLE CELL COMPRISING SAID CATHODE

This invention relates to a cathode for the reduction of oxygen which is primarily intended to equip a reversible or rechargeable fuel cell. This type of cathode is also known as an air cathode since the oxygen may be obtained from the surrounding air.

The invention is also directed to a rechargeable or reversible cell which is equipped with the cathode aforesaid.

It is known that reversible or rechargeable fuel cells are generators which can have a large number of uses, especially in the field of electric traction. In the application just mentioned, efforts are at present being directed to the construction of cells which have a higher specific power output than that of conventional storage batteries.

A reversible cell of the air-zinc type has thus already been constructed. Practical experiments have shown that the performances of this type of cell were dependent on the intrinsic characteristics of the air cathode employed. In fact, the relatively high specific power output of this cell is primarily due to the fact that the air cathode in turn has a high specific power density. The current densities collected by these cathodes are of the order of several tens of $mA/cm^2$ in respect of a relatively low weight of the order of 100 $mg/cm^2$.

These cathodes usually operate in the vicinity of room temperature in an electrolyte consisting of concentrated potassium (5 to 10 times normal) and make use of activated carbon as electrochemical catalyst.

However, said cathodes suffer from a major disadvantage in that their discharge power density decreases at a very fast rate after they have been made to function anodically (recharge of the reversible cell).

In order to overcome this disadvantage, two solutions have been proposed:
the use of a third electrode in the cell solely for the purpose of recharging. In this case, however, the structure of the cell becomes more complicated and considerable difficulties are encountered in the performance of the various switching operations;
the use of an electrode in which the catalyst consists of a metal oxide or in which the structure is such that wetting by the electrolyte is variable during the charge and discharge cycles. In this case, however, the specific power density of the cathode is lower and/or the construction of the cathode becomes very complicated and costly.

The aim of the invention is to overcome the disadvantages mentioned in the foregoing, especially by providing a cathode for the reduction of oxygen in which carbon is employed as electrochemical catalyst and in which the discharge performances remain satisfactory even after the cell has been subjected to a large number of consecutive discharge and recharge cycles.

The cathode which is contemplated by the invention and is primarily intended to be employed in a rechargeable cell comprises a support on which is placed an electrochemical catalyst consisting of finely-divided carbon.

In accordance with the invention, said finely-divided carbon is of the non-porous carbon-black type constituted by a chain of substantially spherical particles and having a specific surface within the range of 50 to 600 $m^2/g$, said carbon black having been subjected to a thermochemical treatment in a chlorine atmosphere at a temperature within the range of 1500° to 3000°C.

The specific surface of a carbon black of this type clearly distinguishes this latter from the active carbons which have a distinctly larger specific surface (800 to 1500 $m^2/g$). The crystalline structure of the carbon black aforesaid is also much more ordered than that of the active carbons. This structure is of the turbostratic graphitic type which is that of a polycrystalline carbon in which the graphitic planes (constituted by hexagons) are parallel as in graphite but displaced with respect to the structure of graphite.

In this structure, the graphitic planes are located at a distance of approximately 3.35 to 3.55 A from each other and the mean thickness of the crystal domains at right angles to the planes aforesaid is usually within the range of 10 to 100 A.

The carbon blacks which are contemplated by the invention have a specific surface within the range of 50 to 600 $m^2/g$. These limits can be considered as critical; it should nevertheless be observed that, below 50 $m^2/g$, the catalytic properties become insufficient for the application which is contemplated by the invention. Furthermore, above 600 $m^2/g$, the carbon blacks usually become porous and this is also unacceptable.

It has been found that a cathode in which a carbon black of this type is provided as catalyst had a very high specific power density which is especially remarkable on account of the fact that said power density remains practically unchanged after a large number of consecutive discharge-recharge cycles.

This result can essentially be attributed to the thermochemical treatment in a chlorine atmosphere.

In fact, the chlorine treatment makes it possible to eliminate the surface impurities of the carbon black which appear to be responsible for the progressive variation of the electrical properties of the cathode when this latter is subjected to consecutive discharge-recharge cycles.

In a preferred embodiment, the carbon black has a specific surface within the range of 120 to 250 $m^2/g$ and has been subjected to one of the following thermochemical treatments:
approximately 1800°C in the presence of chlorine;
1500°C to 2000°C in a chlorine atmosphere associated with heating in an inert atmosphere at a temperature within the range of 2000°C to 3000°C.

So far as concerns the fabrication of the electrode proper, the carbon which has been subjected to the treatment aforesaid is preferably mixed with a suspension containing polytetrafluoroethylene, the mixture thus obtained is spread over a conductive grid, said grid is subjected to a pressure of approximately 50 $kg/cm^2$ and the aggregate is treated at 300°C in an inert atmosphere for approximately 2 hours.

A cathode which has a very compact structure and is convenient to use is thus obtained.

The invention also relates to a rechargeable cell comprising a cathode in accordance with the invention or obtained in accordance with the method aforesaid.

In accordance with the invention, said cell comprises means whereby the electrolyte which circulates within the rechargeable cell is maintained at a low temperature and means for removing the organic products of degradation which are released into the electrolyte by the carbon at the time of the cell charge cycle.

It has in fact been found that cooling of the electrolyte made it possible to reduce the rate of degradation of the carbon at the time of charging and that it was an advantage to remove the products of degradation of carbon which are liable to poison the active surface of the cathode.

Further properties of the invention will become apparent from the following description, reference being made to the accompanying drawings which are given by way of example and not in any limiting sense, and in which.

Figure 1:
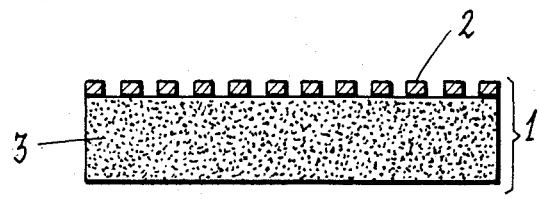
FIG. 1 is a sectional view of a cathode in which the electrochemical catalyst consists of a carbon black obtained by means of the method in accordance with the invention.

In the embodiment of FIG. 1, there is shown a cathode 1 comprising a support constituted by a grid 2 formed of nickel, for example, against which is pressed a pellet 3 composed of finely divided carbon black and of a binder such as polytetrafluoroethylene.

In accordance with the invention, the carbon black employed is constituted by a chain of substantially spherical particles having a specific surface within the range of 50 to 600 m²/g as measured by the B.E.T. method. This type of carbon is characterized in that it has a relatively ordered structure.

It has been determined by X-ray diffraction that in this structure, the atoms are located in parallel planes such that the inter-plane distance C/2 is within the range of 3.35 A to 3.55 A approximately, the mean thickness of the crystal domains at right angles to the planes aforesaid being substantially within the range of 10 to 100 A. The crystal structure of these carbons is consequently close to that of graphite but the graphitic planes are displaced with respect to those of graphite.

A carbon of this type can be obtained in accordance with the invention by employing a carbon black of the type commercialized by the G. L. Cabot Company under the designation of M.P.C. (Medium Processing Channel) tunnel black of the Spheron-6 type and by subjecting said carbon black to a heat treatment at temperatures within the range of 1500°C and 3000°C in an atmosphere of a halogen such as chlorine. This treatment has the effect of removing practically the entire quantity of impurities and especially the surface impurities of the carbon. The carbon aforesaid consists of a chain of substantially spherical particles having a mean diameter within the range of 200 to 400 A and has a specific surface in the vicinity of 120 m²/g.

Good results are obtained when the temperature of the heat treatment is in the vicinity of 1800°C and when the atmosphere consists of chlorine.

Good results can also be obtained by subjecting the carbon black aforesaid to a thermochemical treatment in a chlorine atmosphere at a temperature within the range of 1500°C to 2000°C associated with heating in an inert atmosphere (nitrogen or argon) at a temperature within the range of 2000°C to 3000°C.

Excellent results are also obtained by applying any one of the thermochemical treatments aforesaid to the following carbon blacks:

Black Pearls 800 having a specific surface equal to 250 m²/g and commercialized by G. L. Cabot, Vulcan P having a specific surface equal to 150 m²/g and also commercialized by G. L. Cabot.

In order to obtain the cathode proper as shown in FIG. 1, the carbon obtained on completion of the abovementioned heat treatment is mixed with a suspension containing by way of example 30 % polytetrafluoroethylene, the mixture thus obtained is spread over the grid 2 and the aggregate is subjected to a pressure of approximately 50 kg/cm² so as to obtain the pellet 3. The cathode 1 which is thus formed is then subjected to a heat treatment at 300°C in a nitrogen or argon atmosphere for a period of approximately 2 hours, particularly with a view to obtaining good cohesion between the carbon particles and the polytetrafluoroethylene binder.

The quantity of carbon employed for said cathode varies between 20 and 100 mg/cm² of apparent surface of the cathode and preferentially between 30 and 60 mg/cm². A cathode of this type which is employed in a reversible cell containing an alkaline electrolyte such as 5N potassium involves the following oxygen reduction reactions at the time of discharge:

$$O_2 + 2H_2O + 4e \longrightarrow 4OH^-$$

and $O_2 + H_2O + 2e \longrightarrow OH^-$ and $HO_2^-$

The following reverse reaction takes place during the charge:

$$4OH^- \longrightarrow O_2 + 2H_2O + 4e$$

The last reaction results in more or less substantial degradation of the carbon employed in known air cathodes and produces a decrease in the cathode current after several consecutive charge-discharge cycles.

Said decrease in the cathode current has been considerably reduced in the case of cathode in which the carbon employed corresponds to the definition given above as will be shown hereinafter.

It has also been observed that this decrease in cathode current could be reduced even further by depositing on the carbon between 3 and 10 % of a catalyst selected from silver, platinum and the metallic chelates.

These compounds in fact catalyze the decomposition of the peroxides formed at the time of charging and consequently limit degradation of the carbon of the electrode as a result of oxidation.

The best results have been achieved by means of silver which is obtained by reduction of ammoniacal silver nitrate and deposited on the carbon which has been treated in the manner described earlier. The quantity of silver deposited is comprised between 1 and 20 %, good results having been obtained more particularly with 5 % silver.

Figure 2:
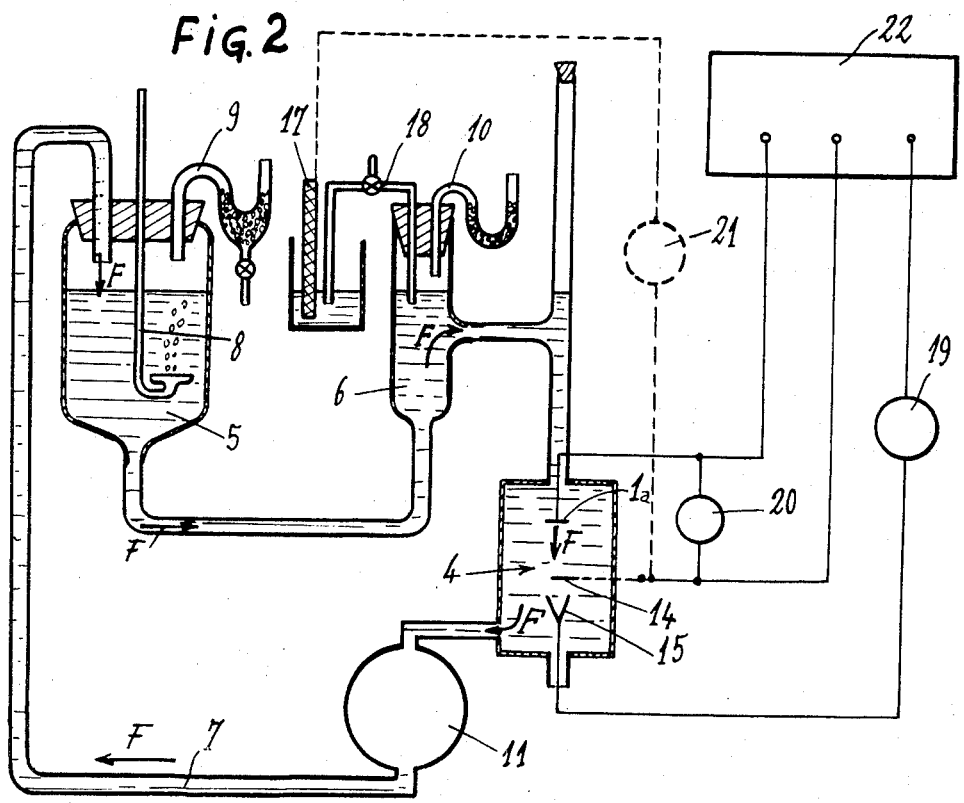
FIG. 2 is a diagrammatic view of a measuring installation for determining the performances of different types of carbons.

The installation employed for carrying out experiments on carbons and activated carbons of different types is illustrated in FIG. 2. Said installation essentially comprises a measuring cell 4 and two reservoirs 5 and 6 located upstream of the cell 4 relative to the direction of flow of the electrolyte 7 as indicated by the arrows F. The electrolyte 7 consists of a 5 times normal potassium solution. An oxygen diffuser 8 is immersed in the reservoir 5, thereby ensuring continuous saturation of the electrolyte with oxygen. The second reservoir 6 serves to eliminate the oxygen bubbles which may have been entrained. The traps 9 and 10 which contain the potassium in the form of pellets protects the electrolyte 7 from the $CO_2$ contained in the atmosphere. The pump 11 which is placed downstream of the cell 4 serves to ensure circulation of the electrolyte 7.

Figure 3:
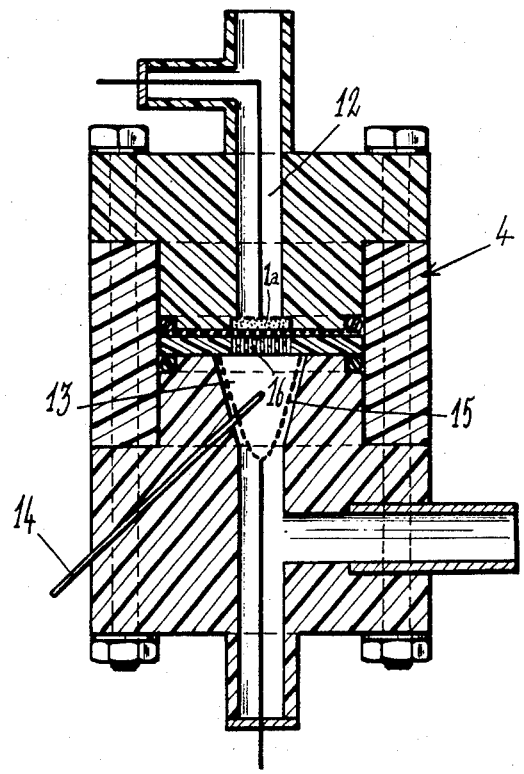
FIG. 3 is a longitudinal sectional view of the experimental cell which is employed in the installation of FIG. 2.

The measuring cell 4 which is shown in detail in FIG. 3 comprises the carbon 1a to be studied, the compartment 13 of the comparison electrode 14 and of the counter-electrode 15 and a porous plate 16 which separates the compartments 12 and 13 so as to prevent any secondary reactions from taking place at the level of the counter-electrode 15 and interfering with the carbon 1a to be studied. The carbon 1a is provided in the form of a compressed bed which is traversed by the circulating electrolyte 7.

The counter-electrode 15 is constituted by a nickel fabric element of substantially conical shape and the comparison electrode 14 is a gold thread coated with epoxy resin except for the extremity which is alone in contact with the electrolyte 7.

The installation shown in FIG. 2 further comprises a saturated calomel electrode 17, the junction of which is established with the electrolytic circuit by means of the bridge 18. The electrode 17 serves to control the potential of the comparison electrode 14.

Measurements of currents and differences in potential between the different electrodes are performed by means of the milliammeter 19 and millivoltmeters 20 and 21, direct current at constant potential being supplied through the potentiostat 22.

1. Influence of the nature of the carbon employed on the initial polarization curves:

In these experiments, there were employed successively:
 a. carbons of the Cabot Coke type in which the mean particle diameter is of the order of 4100 A and in which the specific surface as determined by the B.E.T. method is of the order of 6 m²/g,
 b. carbons of the active Norit type in which the specific surface is of the order of 1500 m²/g,
 c. carbons of the Graphon type in which the mean arithmetical particle diameter is of the order of 400 A and in which the specific surface is of the order of 100 m²/g,
 d. and carbons of the Spheron-6 type in which the mean particle diameter is within the range of 200 to 400 A and in which the specific surface is equal to approximately 120 m²/g as treated by means of the method according to the invention at 1800°C in a flow of $Cl_2$.

Figure 4:
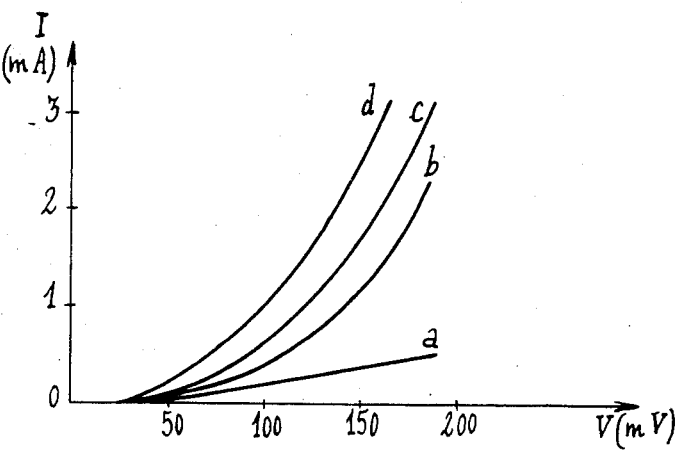
FIG. 4 represents initial polarization curves in respect of different types of carbons obtained by means of the installation shown in FIG. 2.

The curves a, b, c, d which are shown in FIG. 4 reproduce the initial polarization curves obtained by employing the carbons defined in the aforesaid paragraphs (a), (b), (c), (d).

The curve d relating to a carbon which has been treated in accordance with the method of the invention shows that a very high cathode current I is obtained in respect of a low weight of carbon (2.5 mA in respect of 80 mg of carbon and in respect of an overvoltage V of 150 mV).

In respect of identical quantities of carbon, the current intensities I are of distinctly lower value in the case of the other types of carbons (see curves a to c).

2. Study of the variation in cathode current as a function of the number of discharge-charge cycles The following experiments have been performed on a cathode of the type described with reference to FIG. 1 by employing successively:
 e. carbons of the aforementioned Active Norit type,
 f. carbons of the Spheron-6 type treated thermochemically at approximately 1800°C in a $Cl_2$ atmosphere as indicated in the foregoing,
 g. carbons of the Spheron-6 type treated thermochemically at approximately 1800°C in a $Cl_2$ atmosphere on which 5 % by weight of silver was then deposited by reduction of ammoniacal silver nitrate,
 h. carbon blacks of the Black Pearls 800 type treated thermochemically at approximately 1800°C in a $Cl_2$ atmosphere but not silvered,
 i. carbon blacks of the Vulcan P type treated thermochemically at approximately 1800°C in a $Cl_2$ atmosphere but not silvered.

Figure 5:
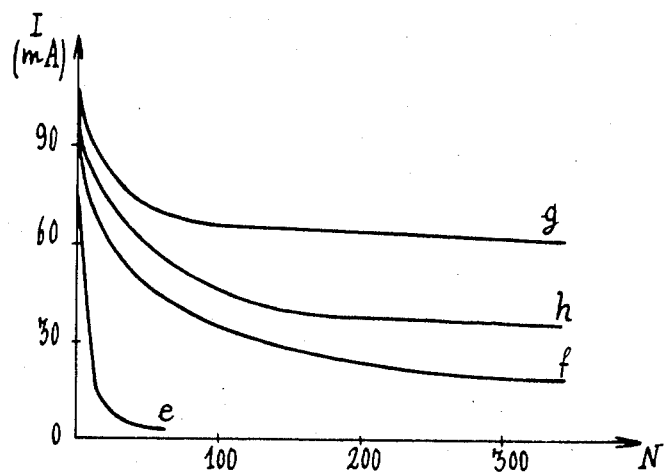
FIG. 5 represents curves of discharge intensity as a function of the number of recharge cycles in the case of cathodes having a number of different carbons.

The curves e, f, g and h shown in FIG. 5 reproduce the curves of variation of the cathode current I as a function of the number N of discharge-charge cycles. The total time-duration of one complete cycle was 2 hours, comprising ½ hour on discharge and 1½ hours on charge, the charge current being equal to two-thirds of the initial discharge current.

The best results have been obtained by means of a cathode comprising a carbon of the Spheron-6 type treated thermochemically at approximately 1800°C in the presence of $Cl_2$ and then silvered as indicated in paragraph (g) above. It is in fact apparent from the curve g that the current I remains very stable even after 300 charge-discharge cycles.

The results are again correct in the case of the cathode having a carbon base of the Spheron-6 type and treated thermochemically at approximately 1800°C in a $Cl_2$ atmosphere but not silvered (see curve f). On the other hand, in the case of a cathode having an Active Norit carbon base, the cathode current I decreases very rapidly and tends towards zero at the end of only a few cycles. This result is explained by the oxidation of the carbon during the charge.

The curve h shows in addition that the unsilvered carbon of the Black Pearls 800 type provides intermediate results between those obtained by means of silvered Spheron-6 (g) and the unsilvered Spheron-6 (f).

The results obtained by means of a cathode comprising carbon of the Vulcan P type (not shown) are comparable with those obtained with Spheron-6. This result is due to the fact that these two types of carbon have specific surfaces which are close in value (120 and 150 m²/g).

Figure 6:
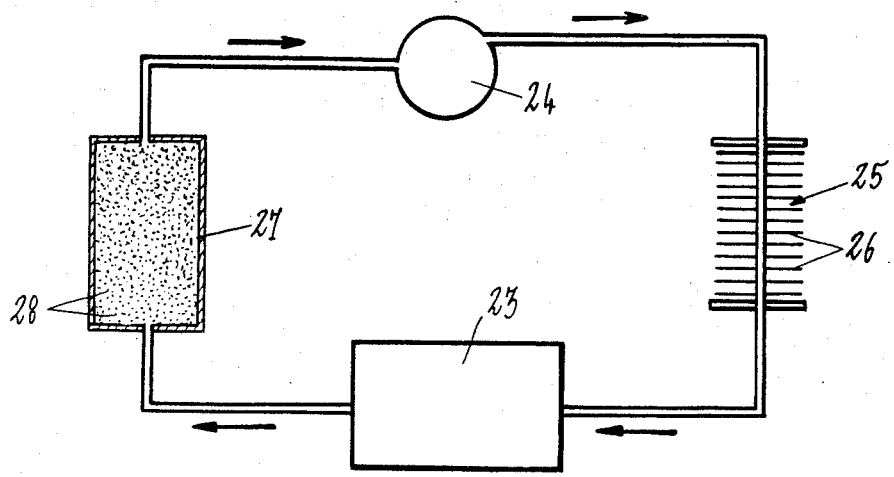
FIG. 6 is a diagrammatic view of an installation for circulating and cooling the electrolyte associated with a rechargeable cell.

Experiments have also shown that the rate of degradation of the carbon of the cathode during the charge increases with the temperature. It is consequently an advantage to ensure that the charge cycle is performed at low temperature. In the embodiment of FIG. 6, there is shown a diagram of an installation comprising a reversible cell 23 in which provision is made for an air cathode in accordance with the invention. In this installation, the electrolyte is circulated through a heat exchanger by means of the pump 24 during the charge periods. Said heat exchanger can be a radiator 25 provided with cooling fins 26 as shown in FIG. 6. This installation further comprises a filter 27 filled with activated carbon particles 28 such as the Active Norit type mentioned earlier by way of example.

These activated-carbon particles 28 make it possible to absorb the organic products of degradation and in particular the polyaromatic compounds which are released into the electrolyte by the carbon during the charge cycle. Taking into account the size of these molecules, it is preferable to ensure that the activated carbon which is employed for the purpose of absorbing these latter has a large open-pore volume.

Figure 7:
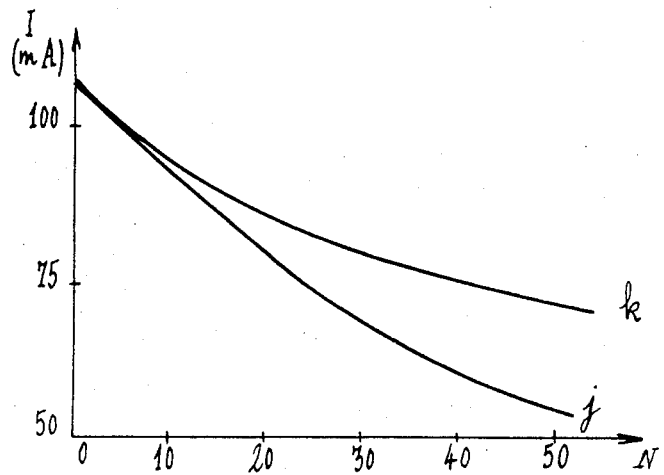
FIG. 7 represents curves which are similar to those of FIG. 5 under different conditions of operation of the cathode in accordance with the invention.

The curves $j$ and $k$ shown in FIG. 7 reproduce the variation in cathode current I as a function of the number N of charge-discharge cycles in the case of an installation which is not provided with a filter (curve $j$) and in the case of an installation which is provided with the filter 27 (curve $k$).

The air cathode employed is provided in both cases with a catalyst consisting of carbon of the Spheron-6 type and treated at approximately 1800°C in a $Cl_2$ atmosphere. It is observed from the curves $j$ and $k$ that the current I decreases less rapidly as a function of N when the installation is equipped with a filter than when no provision is made for a filter.

As shown by the results of the experiments given in the foregoing, the air cathode in accordance with the invention offers two main advantages, viz:

a high current density on discharge (several tens of mA per cm$^2$ of apparent surface of the cathode in respect of a weight comprised between 20 and 100 mg), a current density which remains practically constant after several hundred discharge cycles.

The results obtained by means of the air cathode in accordance with the invention consequently make this latter particularly well suited to the construction of reversible or rechargeable cells of the air-zinc type, for example, which have high specific power densities and can be employed in particular for electric traction.

It will be readily understood that the invention is not limited to the examples which have just been described.

It is possible in particular to modify the structure of the cathode so as to adapt this latter to the different measuring installations or to the different constructional designs of fuel cells. From this it accordingly follows that different techniques for the construction of electrodes of the type shown in FIG. 1 may be adopted for the use of the carbon obtained in accordance with the invention.

It is also possible to employ carbons other than those indicated by way of example in the foregoing description on condition that, when they are finally formed, such carbons have a specific surface which is at least equal to 50 m$^2$/g and smaller than 600 m$^2$/g, a relatively ordered structure which corresponds to the characteristics given above and a practically total absence of surface impurities.

What we claim is:

1. A cathode for the reduction of oxygen and especially for a rechargeable cell, comprising a support on which is placed an electrochemical catalyst consisting of finely-divided carbon, wherein said carbon is of the non-porous carbon-black type constituted by a chain of substantially spherical particles and having a specific surface within the range of 50 to 600 m$^2$/g, said carbon black having been subjected to a thermochemical treatment in a chlorine atmosphere at a temperature within the range of 1500° to 3000°C.

2. A cathode for the reduction of oxygen according to claim 1, wherein the carbon black has a specific surface within the range of 120 to 250 m$^2$/g, said carbon black having been subjected to a thermochemical treatment in a chlorine atmosphere at a temperature substantially equal to 1800°C.

3. A cathode for the reduction of oxygen according to claim 1, wherein the carbon black has a specific surface within the range of 120 to 250 m$^2$/g, said carbon black having been subjected to a thermochemical treatment in a chlorine atmosphere at a temperature within the range of 1500°C to 2000°C associated with heating in an inert atmosphere at a temperature within the range of 2000°C and 3000°C.

4. A rechargeable cell comprising a cathode according to claim 1 and associated with an installation in which the electrolyte of the cell is circulated, wherein said installation comprises means for maintaining the electrolyte at low temperature and means for removing the organic products of degradation which are released by the carbon at the time of the charge cycle of the cell.

5. A rechargeable cell according to claim 4, wherein the means for maintaining the electrolyte at low temperature are constituted by a radiator having cooling fins.

6. A rechargeable cell according to claim 4, wherein the means for removing the organic products of degradation are constituted by a filter containing activated carbon.

* * * * *